C. L. WELLS.
LUBRICATING DEVICE.
APPLICATION FILED NOV. 30, 1920.
1,397,065.
Patented Nov. 15, 1921.
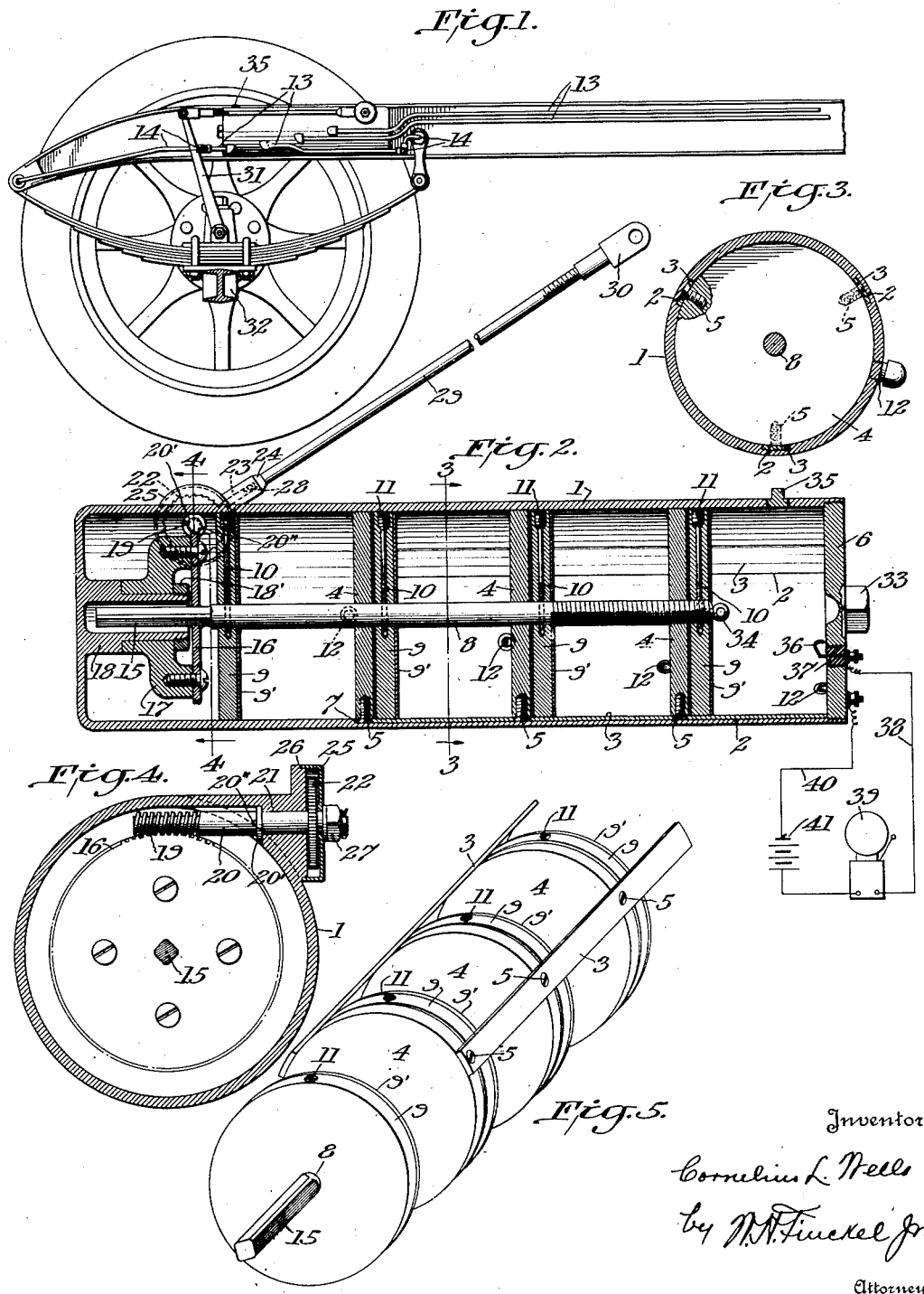

UNITED STATES PATENT OFFICE.

CORNELIUS L. WELLS, OF CUMBERSTONE, MARYLAND.

LUBRICATING DEVICE.

1,397,065.   Specification of Letters Patent.   Patented Nov. 15, 1921.

Application filed November 30, 1920. Serial No. 427,283.

*To all whom it may concern:*

Be it known that I, CORNELIUS L. WELLS, a citizen of the United States, residing at Cumberstone, in the county of Anne Arundel and State of Maryland, have invented a certain new and useful Improvement in Lubricating Devices, of which the following is a full, clear, and exact description.

The object of this invention is to provide a device for supplying lubricant to various bearings and the like members of machinery, and it is particularly adapted for use in supplying grease or heavy oil to the various bearings of an automobile now generally provided with grease cups, such as spring shackles and shaft bearings, whereby the source of supply of lubricant for such parts is centralized, constant feed of the lubricant assured, and replenishing of the supply of lubricant facilitated.

The invention consists in a follower type of lubricator, comprising, in its preferred form, a lubricant container such as a casing in the form of a cylinder, partitioned into a plurality of chambers from which lead trunk or main conduits to which may be connected auxiliary conduits extending to the various parts to be lubricated; and each chamber containing a follower or piston provided with actuating means, whereby, when the device is mounted upon a relatively stationary part and the follower actuating means connected with a relatively movable part, the relative movement between these parts will cause the follower actuating mechanism to advance the followers in their respective chambers; and the invention consists further in means whereby the followers and partitions may be removed from the casing for introducing lubricant and for cleaning and repair.

In the accompanying drawings illustrating the invention, in the several figures of which like parts are similarly designated, Figure 1 illustrates a portion of the front end of an automobile showing the device of the invention applied thereto. Fig. 2 is a central longitudinal section of the device. Fig. 3 is a section taken in the plane of line 3—3, Fig. 2. Fig. 4 is a section taken in the plane of line 4—4, Fig. 2, and Fig. 5 is a perspective view showing the chamber partitions and followers removed from the casing.

The device of the invention comprises a lubricant container preferably in the form of a cylindrical casing 1 provided with a plurality of longitudinally arranged slots or guideways 2, preferably three in number as shown, in which are arranged a corresponding number of slides 3 carrying partitions 4 secured to the slides as by screws or the like 5. These slides with their partitions form a cage adapted to be slipped into the casing and held therein by means of a cap 6 threaded into the end of the casing and abutting against the ends of the slides 3, the opposite ends of these slides abutting against the ends 7 of the slots 2. Extending through the partitions 4 and threaded into one of same, preferably the front one, is a shaft 8 carrying a plurality of followers or pistons 9 keyed to it by means of pins 10 formed as a part of screws 11, whereby the followers are caused to turn with the shaft and be advanced as the shaft is rotated and screwed into the partition, as will be later described. If desired, washers 9' may be placed between the followers 9 and the lubricant, so that the adhering nature of the lubricant will not impede the movement of the followers. Also, the followers may be provided with suitable packing rings. By this construction, it will be seen that the casing 1 is divided into a plurality of chambers, each of which is provided with a follower or piston. Each chamber has an outlet port 12 communicating with a main or trunk conduit 13 (see Fig. 1), from which may be extended as many auxiliary conduits 14 as may be necessary to convey lubricant to the various parts to be lubricated.

The end of shaft 8 opposite to that which is threaded into the partition is squared as at 15 and extends through a squared opening in a worm wheel 16 carried by a bearing piece 17 journaled upon a bearing 18 formed in the end of the casing and is secured for rotation upon this bearing 18 by a nut 18'. This worm wheel 16 meshes with a worm 19 formed or secured upon the inner end of a shaft 20 supported in a bearing 21 in the casing and held against outward movement by a washer 20' and pin 20''. Secured upon the outer end of this shaft 20 is a ratchet wheel 22 engaged by a ratchet 23 (see Fig. 2) arranged for operative engagement with the ratchet wheel in a socket member 24 provided with an annular casing 25 adapted to engage an annular seat 26 on the bearing 21

(see Fig. 4) and held in operative engagement therewith by a nut 27 threaded on the end of shaft 20. The ratchet 23 is pressed against the ratchet wheel 22 by a spring 28. The socket member 24 is provided with a lever extension 29 carrying at its outer end a yoke 30 arranged for screw-threaded adjustment on the lever extension 29. This yoke is adapted to be connected with a link 31 mounted upon a part relatively movable with respect to the lubricant container, such as the front axle 32 of a vehicle.

The operation of the device would seem to be obvious, but, in the interest of clearness, it may be said that in the use of the invention illustrated, the casing may be mounted upon the side of one of the side-frame members of a vehicle, as shown in Fig. 1, and the various conduits extending therefrom connected with the parts to be lubricated. The lever extension 29 will be connected by the link 31 with a relatively movable part, such as the axle 32, as above described. By this arrangement, it will be seen that every spring vibration which is sufficient to move the lever extension 29 so that the ratchet 23 will engage a new tooth upon the ratchet wheel 22, will cause the worm 19 to impart movement to the worm wheel 16 which in turn will advance the followers 9 in their respective chambers in the casing 1 by reason of the screw-threaded engagement of the shaft 8 with one of the partitions 4. As the followers advance in their chambers, the lubricant contained in such chambers will be forced out through the ports 12 and conducted thence through the various conduits 13 and 14 to the parts to be lubricated, the squared end 15 of the shaft 8 sliding through the opening in the worm wheel until the followers have reached the limit of their extruding movement, at which time due to the relative lengths of squared end 15 and follower travel, the squared end will become disengaged from the opening in the worm wheel 16 and further movement of the shaft by the worm wheel prevented.

When it is desired to replenish the supply of lubricant in the device, the cap 6 is unscrewed by means of its squared extension 33 and removed from the casing and a hook or other device may be inserted in the ring 34 attached to the end of the shaft 8 and the cage with the shaft and followers slid out of the casing. After this is done, the shaft may be turned to retract the followers to their initial position, and the parts may be cleaned if desired, after which they will be re-inserted in the casing, and as each partition is moved inward past the open end thereof replenishing lubricant will be forced in the chamber thus formed through an opening in the casing provided by the removal of a plug 35. An ordinary grease gun may be used for this purpose. This operation will be repeated until the cage and the parts carried thereby are fully inserted within the casing and the supply of lubricant in each chamber replenished. Then the cap 6 and plug 35 being replaced, the device will be in condition for further operation.

In order that the operator or attendant of the machine to which my device is applied may be warned of the emptying of the chambers, I may provide the cap 6 with an electrical contact device comprising a flexible contact member 36 mounted in an insulating bushing 37 threaded or otherwise inserted in the cap. This member is connected by suitable wiring 38 with a bell 39, light, or other signal device within hearing or view of the operator, the return wire 40 therefrom being connected with a battery 41 or other source of current and terminating in contact with the cap 6. By this arrangement, it will be seen that when the follower 9 in the chamber adjacent the cap 6 forces the flexible contact member 36 into contact with the cap, an electric circuit will be established through the signal device and the operator warned.

Although I have herein shown and described a particular embodiment and application of my invention, it is to be understood that I do not intend that the invention should be considered limited thereby, as various changes in details of construction and arrangement of parts and application of the device to various kinds of machinery may be made without departing from the spirit of the invention and the scope of the following claims.

What I claim is:—

1. In a lubricating device, a lubricant container comprising a casing divided internally into a plurality of chambers, a follower in each of said chambers, a shaft upon which said followers are mounted and with which they are adapted to rotate, means defining an outlet port for each of said chambers, means adapted to impart rotary movement to said shaft and means in said casing coöperating with said shaft for advancing said followers in their respective chambers upon rotation of said shaft to express the lubricant therefrom through said outlet ports.

2. In a lubricating device, a lubricant container comprising a casing divided internally into a plurality of chambers, a follower in each of said chambers, a slidable rotatable shaft upon which said followers are mounted and with which they are adapted to move axially of the shaft, means defining an outlet port for each of said chambers, and means adapted to impart rotary movement to said shaft for advancing said followers in their respective chambers to express the lubricant therefrom through said outlet ports, said lubricant container adapted to be mounted upon a relatively stationary member, and said shaft actuating means adapted to be connected with a relatively movable member for imparting movement to said shaft.

3. In a lubricating device, a lubricant container comprising a casing, a plurality of partitions arranged transversely thereof to form a plurality of chambers therein, a shaft having screw-threaded engagement with one of said partitions, a follower in each of said chambers and connected with said shaft, and gearing connected with said shaft and adapted to rotate same to cause the screw-threaded engagement of said shaft with said partition to advance said followers in their respective chambers, for the purpose specified.

4. In a lubricating device, a lubricant container comprising a casing provided with a plurality of partitions by which it is divided into separate lubricant containing chambers, a shaft extending through said partitions and having screw-threaded engagement with one of same, a follower in each of said chambers and connected with said shaft, gearing mounted in said casing and operatively engaging said shaft to rotate same and screw it into said screw-threaded partition whereby said followers are advanced in their chambers, and means for imparting movement to said gearing.

5. In a lubricating device, a lubricant container comprising a casing provided with a plurality of partitions by which it is divided into separate lubricant containing chambers, a shaft extending through said partitions and having screw-threaded engagement with one of same, a follower in each of said chambers and connected with said shaft, gearing mounted in said casing and operatively engaging said shaft to rotate same and screw it into said screw-threaded partition whereby said followers are advanced in their chambers, and means for imparting movement to said gearing including a pawl and ratchet mechanism.

6. In a lubricating device, a lubricant container comprising a casing provided with a plurality of partitions by which it is divided into lubricant containing chambers, a worm and wheel gearing mounted in said casing, a ratchet mechanism connected with said gearing and provided with means whereby it may be actuated to impart motion to said gearing, a shaft journaled in said partitions and having screw-threaded engagement with one of same and operative sliding engagement with the worm wheel of said gearing, and a follower for each of said chambers, said followers being connected to said shaft for movement therewith, whereby when said gearing is actuated said shaft will be rotated and screwed into the partition wherewith it has screw-threaded engagement and the followers thereby advance in their chambers.

7. In a lubricating device, a casing adapted to contain lubricant, a follower mounted in said casing and adapted to express the lubricant therefrom, a shaft upon which said follower is mounted, gearing connected with said shaft for imparting rotary motion thereto and advancing said follower in the casing, the connection between said shaft and gearing adapted to become disengaged when said follower has reached the limit of its expressing movement.

8. In a lubricating device, a casing adapted to contain lubricant, a follower in said casing adapted to express the lubricant therefrom, a shaft upon which said follower is mounted, gearing coöperating with said shaft for imparting rotary motion thereto, said shaft having a sliding separable connection with said gearing, whereby the shaft may become disengaged from said gearing when said follower reaches the end of its expressing movement.

9. In a lubricating device, a casing adapted to contain lubricant, a partition in said casing, a shaft threaded into said partition, a follower for expressing said lubricant and mounted on said shaft for movement therewith, said shaft provided with a polygonal end, a gear for imparting rotary motion to said shaft, said gear having a complemental seat for the polygonal end of said shaft and providing a sliding driving engagement therewith, the extent of sliding engagement between these parts being less than the full threading engagement of said shaft and partition, whereby when said follower has been advanced to the limit of its expressing movement said shaft will become disengaged from its seat in said gear.

10. In a lubricating device, a lubricant container comprising a casing formed with a plurality of guides, a plurality of slides adapted to coöperate with said guides, partitions carried by said guides and arranged in fixed relation thereto, a shaft carried by said partitions, and a plurality of followers carried by said shaft, said slides, partitions, shaft and followers being removable from and replaceable in said casing as a unit.

In testimony whereof I have hereunto set my hand this 29th day of November, A. D., 1920.

CORNELIUS L. WELLS.

Witnesses:
W. H. FINCKEL, Jr.,
LILLIE M. KEELER.